United States Patent [19]
Toth et al.

[11] Patent Number: 5,480,490
[45] Date of Patent: Jan. 2, 1996

[54] METHOD FOR PURIFYING BEET JUICE USING RECYCLED MATERIALS

[75] Inventors: Laszlo Toth, Thornton; John E. Sagaser, Denver, both of Colo.

[73] Assignee: The Western Sugar Company, Denver, Colo.

[21] Appl. No.: 386,939

[22] Filed: Feb. 10, 1995

[51] Int. Cl.$^6$ .............................. C13D 3/00; C13J 1/02; B01D 15/00

[52] U.S. Cl. .............................. 127/42; 127/46.1; 127/48; 127/50; 127/53; 127/55

[58] Field of Search .............................. 127/42, 46.1, 48, 127/50, 53, 55

[56] References Cited

U.S. PATENT DOCUMENTS

| | | |
|---|---|---|
| 1,578,463 | 3/1926 | Nicholson et al. |
| 1,815,276 | 7/1931 | Schwieger |
| 2,164,186 | 6/1939 | Brown et al. ............................. 127/50 |
| 2,547,298 | 4/1951 | Wiklund .................................. 127/50 |
| 2,557,800 | 6/1951 | Seailles .................................... 127/52 |
| 2,697,049 | 12/1954 | Brieghel-Müller ...................... 127/50 |
| 2,774,693 | 12/1956 | Brieghel-Müller ...................... 127/50 |
| 2,824,028 | 2/1958 | Zenzes ..................................... 127/50 |
| 2,977,253 | 3/1961 | Grandadam ............................. 127/50 |
| 3,089,789 | 5/1963 | Van Note ................................. 127/50 |
| 3,113,044 | 12/1963 | Alston ..................................... 127/48 |
| 3,168,419 | 2/1965 | Galé ........................................ 127/50 |
| 3,734,773 | 5/1973 | Haley ...................................... 127/48 |
| 4,795,494 | 1/1989 | Toth et al. ............................... 127/48 |
| 5,320,681 | 6/1994 | Moc et al. ............................... 127/46.1 |

OTHER PUBLICATIONS

*Beet Sugar Technology*, pp. 567–593 (month N.A).

Primary Examiner—Paul Lieberman
Assistant Examiner—Patricia Hailey
Attorney, Agent, or Firm—Jay K. Malkin; Klaas, Law, O'Meara & Malkin

[57] ABSTRACT

A beet juice treatment method in which reaction products are recycled. Beet juice is first prelimed with lime and $CaCO_3$ to produce first and second juice fractions. The second fraction contains flocculated materials, and is combined with $CO_2$. Solid flocs and calcium carbonate reaction products are removed from the second fraction. The second fraction and first fraction are then recombined to produce a third juice fraction which is combined with lime in a main liming stage for additional purification. The third fraction is then supplied with additional $CO_2$ to generate a $CaCO_3$ sludge product. The sludge product is divided into first and second portions. The first portion is reused in the preliming stage. The second portion is converted to regenerated lime for reuse in the main liming stage and possibly the preliming stage. These steps reduce waste production and provide economic benefits.

20 Claims, 1 Drawing Sheet

FIG.1

METHOD FOR PURIFYING BEET JUICE USING RECYCLED MATERIALS

BACKGROUND OF THE INVENTION

The present invention generally relates to the production of purified sugar beet juice, and more particularly to a highly efficient purification process for beet juice which uses recycled lime and recycled calcium carbonate compositions. As a result, waste materials and reaction by-products are substantially eliminated while greatly improving the efficiency of the entire treatment process.

Sugar beets provide a substantial and economical supply of sugar (sucrose) for many purposes. To obtain a completed, purified sugar product from sugar beet materials, raw beets are treated to remove juices therefrom. The juices are thereafter subjected to numerous isolation and purification steps so that a final sugar product can be obtained. In a typical treatment process, sugar beet juice is obtained by physically slicing raw beets into strips or "cossettes" which are placed in contact with heated water. As a result, sugar-containing beet juice is extracted to produce a raw juice product. This material normally contains a moderate amount of solid particulate matter therein (primarily derived from the initial raw beets). In most cases, the raw juice product contains about 0.2–0.5% by weight solid, undissolved materials, and about 13–16% by weight water-soluble compositions.

The raw juice is thereafter treated using one or more mechanical screening processes to remove most of the solid matter therefrom. The resulting strained juice product is commonly known as "diffusion juice". This material (which is ultimately subjected to additional treatment steps) typically includes water, sugar (sucrose), dissolved non-sugar impurities, and colloidal (suspended) non-sugar impurities. The non-sugar impurities are often highly colorized and/or thermally unstable. In this regard, they can interfere with subsequent treatment steps and adversely impact the quality and quantity of the final sugar product. It is therefore necessary to remove as many non-sugar impurities from the diffusion juice as possible. At this stage in the process, the diffusion juice typically contains about 82–85% by weight water, about 13–15% by weight sugar, and about 2.0–3.0% by weight dissolved/colloidal non-sugar impurities. The overall weight of the diffusion juice is about 105–130% of the weight of the raw beet materials being processed.

Conventional beet juice purification processes initially involve a step known as "preliming" in which the pH of the incoming juice materials is raised from an initial (starting) level of about 6.3–6.5 to a level above about 11.6 (e.g. optimally between about 11.5–11.8). Preliming of the diffusion juice provides many functional benefits, including improved flocculation of impurities (discussed below), as well as enhanced pH stabilization, decolorization, and filterability. In particular, preliming enables substantial amounts of undesirable materials to be precipitated from the juice. These materials include but are not limited to inorganic acids, organic acids, phosphates, metal ions (e.g. iron, aluminum, and/or magnesium ions), proteins, pectins, coloring agents, and saponins.

The addition of lime materials to accomplish preliming is typically undertaken in a preliming vessel. While many different vessels can be used for this purpose, a preferred system is disclosed in U.S. Pat. No. 2,774,693 to Brieghel-Möller which is incorporated herein by reference and further discussed below. The particular system disclosed in the foregoing patent involves a tank having a plurality of chambers and multiple mixing blades therein. Within the tank, lime (and calcium carbonate materials) are added to the incoming diffusion juice in a controlled, gradual, and progressive manner, with the particular details of this process being discussed in U.S. Pat. No. 2,774,693 cited above. The terms "lime", "lime materials", "milk of lime", and "lime compositions" as used herein shall be considered equivalent, and will specifically involve calcium oxides or calcium hydroxides in solid or liquid (suspension) form. Milk of lime is preferred in most juice purification processes, and consists of a suspension of calcium hydroxide ($Ca(OH)_2$) which is formed in accordance with the following reaction:

$$CaO+H_2O \rightleftharpoons Ca(OH)_2+15.5 \; Cal. \quad (1)$$

Within the preliming tank/containment vessel, a highly efficient treatment process occurs in which the pH of the diffusion juice materials is increased as noted above. This procedure causes non-sugar materials (especially proteins in both dissolved and colloidal form) to flocculate and produce a plurality of solid floc particles. Regarding non-sugar proteins, gradual pH increases which result from the preliming process enable these materials to reach their respective isoelectric points. The term "iso-electric point" as used herein shall involve a pH level at which protein colloidal particles within the diffusion juice materials have a zero electrical potential. When the foregoing materials reach their designated iso-electric points, they flocculate to form a plurality of solid floc particles as indicated above. Flocculation is further enhanced by the addition of calcium carbonate materials which functionally form a core or substrate which is surrounded (encapsulated) by the flocculated protein materials. This process increases the weight and density of the floc particles, thereby facilitating the filtration/settling of such materials and removal from the system.

In conventional processing systems, the resulting mixture of diffusion juice, residual lime, excess calcium carbonate, and floc particles is subjected to a plurality of subsequent steps which are performed in a sequential manner. Specifically, the mixture is first subjected to a cold main liming stage undertaken at a temperature of about 30°–40° C. in which additional amounts of lime (milk of lime) are added, followed by a hot main liming stage performed at a temperature of about 80°–90° C. which involves the further addition of lime (milk of lime). These steps cause the pH of the limed product to increase to a level above about 12.6. As a result, dissolved/colloidal non-sugar materials which were not affected during preliming of the diffusion juice are decomposed. In particular, main liming of the juice materials as described above achieves juice thermostability by partial decomposition of invert sugar amino acids, amides, and other dissolved non-sugar) materials. If not eliminated, these materials can cause serious problems in subsequent processing steps when the juice product is exposed to high temperature and pressure levels.

After main liming, the treated juice product is subjected to a first carbonation stage in which carbon dioxide gas is combined with the product. The carbon dioxide gas reacts with residual lime in the treated juice to produce a substantial amount of calcium carbonate in the form of a fine precipitate. Not only is residual lime removed using this procedure (e.g. typically about 95% by weight of the residual lime), but the surface-active calcium carbonate precipitate is able to adsorb substantial amounts of remaining dissolved non-sugar contaminants. Furthermore, the calcium carbonate precipitate functions as a filter aid in the physical removal of solid materials from the treated juice (e.g. the removal of floc particles). In this regard, the diffusion juice is efficiently filtered and further purified.

The purified juice product is then subjected in most cases to additional heating, one or more additional carbonation steps, and further filtering to produce a purified product conventionally known as "thin juice" which is ready for evaporative thickening and sugar crystallization. Further information regarding this process and related procedures used to treat/purify sugar beet juice materials is provided in U.S. Pat. Nos. 1,578,463 to Nicholson et al.; 1,815,276 to Schweiger; 2,164,186 to Brown et al.; 2,547,298 to Wiklund; 2,557,800 to Seailles; 2,697,049 to Brieghel-Muller; 2,774,693 to Brieghel-Muller; 2,824,028 to Zenzes; 2,977,253 to Grandadam; 3,089,789 to Van Note; 3,113,044 to Alston; 3,168,419 to Galé; 3,734,773 to Haley; and 5,320,681 to Moc et al. which are all incorporated herein by reference.

Notwithstanding the ability of the foregoing process to purify sugar beet juices, it has been discovered that certain floc particles produced during the preliming stage are sensitive. These materials can be destroyed (e.g. resolubilized) by the harsh mechanical/chemical conditions which are present within the main liming and carbonation stages of the process. In most cases, destruction of these materials is caused by the repeptization of protein compositions within the floc particles, as well as physical damage to the floc particles caused by mechanical agitation within the system. As a result, contaminants are reintroduced into the juice materials. To avoid these problems, a processing system was developed that is disclosed in co-owned U.S. Pat. No. 4,795,494 to Toth et al. which is incorporated herein by reference. To avoid reintroduction/dissolution of previously-formed floc materials, U.S. Pat. No. 4,795,494 discloses a method in which the product from the preliming stage (consisting of juice materials combined with floc particles and other dissolved/colloidal contaminants) is temporarily isolated from the system. Instead of directing this product into the main liming stages of the system, it is transferred into a separation system (e.g. a gravity settler tank or comparable unit) in which the floc particles are separated from the prelimed juice fraction. The prelimed juice fraction is then routed into the main liming stages of the process and subsequently treated in one or more carbonation chambers as discussed above. However, the removed floc particles (and residual amounts of juice materials associated therewith) are routed past the main liming stages of the system. These materials are instead routed into the carbonation stages of the process where they join with the initial juice fraction after it has passed through the main liming stages. Because the floc materials are not subjected to the harsh physical/chemical conditions within the main liming stages of the process, the floc particles do not re-dissolve and are readily removed by settling and filtration after carbonation is completed. Not only does this method avoid the re-introduction of contaminants into the purified juice, but likewise ensures that any residual juice materials associated with the floc particles are collected in subsequent portions of the process to obtain maximum sugar production. Further details of this process and variations thereof are again discussed in U.S. Pat. No. 4,795,494 to Toth et al.

Notwithstanding the benefits described above, the foregoing methods (and other, more conventional beet processing systems) generate substantial amounts of calcium carbonate waste products. These products primarily involve calcium carbonate sludge materials obtained from the carbonation of limed juice fractions. They are normally collected and stored in large, open areas, thereby presenting problems from both a safety, environmental, and space-conservation standpoint. The present invention involves a unique and highly efficient method for reclaiming/recycling calcium carbonate waste products so that these materials can be efficiently reused in selected multiple portions of the processing system. As a result, the problems associated with calcium carbonate waste materials are substantially eliminated in a manner which not only prevents environmental problems, but actually improves the efficiency of the entire treatment process by significantly reducing material costs. Accordingly, the multi-stage recycling process of the present invention represents an advance in the art of sugar beet processing, sugar production, and the elimination of waste products as discussed below.

SUMMARY OF THE INVENTION

It is an object of the present invention to provide an improved process for the purification of sugar beet juice materials.

It is another object of the invention to provide a process for the purification of sugar beet juice materials which is readily implemented using a minimal number of process steps.

It is another object of the invention to provide a process for the purification of sugar beet juice materials which is characterized by the reduction and/or substantial elimination of waste products.

It is a further object of the invention to provide a process for the purification of sugar beet juice materials which is characterized by the reduction and/or elimination of calcium carbonate waste products in order to avoid environmental, safety, and storage problems associated therewith.

It is a still further object of the invention to provide a process for the purification of sugar beet juice materials in which calcium carbonate waste materials (e.g. in the form of sludge by-products) are reprocessed and recycled to specific, multiple locations within the processing system. As a result, numerous benefits are achieved including but not limited to: (1) the substantial conservation of resources; (2) an improvement in the purification efficiency of the system by the careful selection of system locations which receive recycled materials; (3) the elimination of calcium carbonate sludge products and the environmental/safety concerns associated therewith; and (4) substantial cost savings associated with the reuse and recycling of materials within the system at multiple stages.

It is an even further object of the invention to provide a method for the purification of sugar beet juice materials in which the recycling/reprocessing of calcium carbonate waste materials is combined with a procedure in which undesired protein materials and other non-sugar compositions are initially flocculated and removed from the system prior to liming in order to create an integrated, multi-step method wherein each particular step contributes to a high degree of system efficiency and economy.

In accordance with the foregoing objects, a highly efficient method for the treatment and purification of sugar beet juice is disclosed. As noted above, the claimed method is characterized by a substantial reduction and/or elimination of waste products (e.g. calcium carbonate-containing sludge materials), as well as cost savings associated with the use of recycled materials. To accomplish these goals, a supply of filtered beet juice (also characterized as "diffusion juice") is initially provided. The diffusion juice includes water, sugar, and dissolved non-sugar impurities. The diffusion juice is then heated (e.g. to a temperature of about 65°–85° C. in a preferred embodiment). The heated juice is thereafter combined in a preliming chamber with a preliminary supply of lime and a preliminary supply of calcium carbonate in a preliming chamber to produce a first juice fraction and a second juice fraction. As noted above, the terms "lime", "lime materials", "milk of lime", and "lime compositions" as used herein shall have an equivalent meaning, and shall encompass calcium oxides or calcium hydroxides in solid or liquid (suspension) form as discussed in further detail below. While the present invention shall not be limited to the use of any particular type of lime materials, it is preferred that milk of lime be used which basically involves an aqueous calcium hydroxide suspension (also discussed below).

The foregoing step (e.g. preliming) results in the production of a first juice fraction and a second juice fraction as indicated above. The second juice fraction primarily comprises a plurality of solid floc particles in combination with residual amounts of diffusion juice. The first juice fraction is substantially free from solid o (particulate) matter and flocculated materials. The floc particles within the second juice fraction are formed from at least a portion of the dissolved/colloidal non-sugar impurities in the beet diffusion juice when the preliminary supplies of lime and calcium carbonate are added. These impurities primarily involve proteins, but may also include inorganic acids, organic acids, phosphates, metal ions (e.g. iron, aluminum, and/or magnesium ions), pectins, coloring agents, and saponins. Regarding the amount of lime to be used at this step of the process, the preliminary supply of lime is preferably o added to the diffusion juice in an amount sufficient to raise the pH of the juice from an initial level of about 6.3–6.5 to a level above about 11.6 (optimally about 11.5–11.8). This increase in alkalinity is a direct result of chemical interactions between the preliminary supply of lime and the juice materials. Flocculation is further enhanced by the addition of the preliminary supply of calcium carbonate in the preliming stage. The calcium carbonate materials form cores or substrates which are surrounded (encapsulated) by the flocculated protein materials. This process increases the weight and density of the floc particles, thereby facilitating the filtration/settling of such materials and subsequent removal from the system as discussed below.

Thereafter, the first juice fraction is physically separated from the second juice fraction. The second juice fraction (containing the floc particles) is then combined with a primary supply of carbon dioxide in a primary carbonation chamber. Carbonation in this manner is designed to remove remaining/residual amounts of the preliminary supply of lime (typically about 95% by weight of the lime) from the second juice fraction by the formation of a solid calcium carbonate reaction product within the second juice fraction. The calcium carbonate reaction product is specifically generated from a combination of the carbon dioxide gas and residual lime materials. Prior to removal from the system, the calcium carbonate reaction product functions as a filter aid which facilitates the removal of additional solid materials from the second juice fraction as it passes through (e.g. comes in contact with) the reaction product. The calcium carbonate reaction product also coats/encapsulates the floc particles received from the second juice fraction by forming a scale-like coating on the particles in order to prevent the repeptization of protein materials within the particles. Furthermore, the calcium carbonate reaction product is surface-active and capable of adsorbing various non-sugar contaminants thereon which remain within the second juice fraction as it passes through (e.g. comes in contact with) the reaction product.

When the second juice fraction is combined with the primary supply of carbon dioxide in the primary carbonation chamber (e.g. before or during combination of these materials), an optional supply of additional calcium carbonate may be added to the second juice fraction to further enhance the filtration, encapsulation, and adsorption capabilities of the system at this stage. Likewise, an optional supply of additional lime (e.g. milk of lime) may be added to the second juice fraction when the second juice fraction is combined with the primary supply of carbon dioxide in the primary carbonation chamber (e.g. before or during combination of these materials). The use additional lime at this stage is designed to generate further amounts of calcium carbonate when the lime is combined (reacted) with carbon dioxide in the primary carbonation chamber. These further amounts of calcium carbonate provide a variety of benefits, including those listed above in connection with the supply of additional calcium carbonate and the calcium carbonate reaction product. Specifically, the further amounts of calcium carbonate generated through the use of additional lime enhance the filter aid, encapsulation, and adsorption capabilities of the system at this stage. The supply of additional lime may be added instead of or in addition to the supply of additional calcium carbonate, with the use of these materials being determined in accordance with preliminary pilot studies on the beet juice compositions of concern. Likewise, the supplies of additional calcium carbonate and lime may involve the use of fresh materials or recycled/regenerated materials from other parts of the system.

The second juice fraction is then separated from the calcium carbonate reaction product (and the encapsulated floc particles combined with the reaction product) so that these materials are effectively removed from the second juice fraction. The calcium carbonate reaction product (and floc particles) which are removed from the second juice fraction may thereafter be used as a livestock feed material/supplement in most cases (depending on the calcium content of these materials). Removal of these materials at this stage in the reaction process is an important part of the claimed system in that it prevents their reintroduction in subsequent (e.g. liming) stages of the system. This procedure (in combination with the recycling/regeneration steps described below) results in a processing technique having a high degree of overall operating efficiency.

The second juice fraction is thereafter recombined with the first juice fraction (which are both substantially free from floc particles and other suspended solids) to produce a third juice fraction. The third juice fraction is then transferred into a main liming chamber for further treatment. When the third juice fraction is transferred into the main liming chamber, it is heated to a temperature of about 85°–90° C. in a preferred embodiment. Heating of the third juice fraction as indicated above may occur during, after, or preferably before transfer of the third juice fraction into the main liming chamber. As noted above, it is preferred that the first and second juice fractions be initially combined and thereafter heated as the third juice fraction prior to entry into the main liming chamber. However, equivalent results may be achieved by individually heating the first and second juice fractions and thereafter combining the first and second fractions within the main liming chamber to produce the third juice fraction. Likewise, it shall be deemed equivalent to accomplish heating of the foregoing individual fractions either before or after entry into the main liming chamber, although it is preferred that heating take place prior to entry.

Within the main liming chamber, the third juice fraction is combined with a main supply of lime to increase the pH of the third juice fraction. Specifically, the main supply of lime is added to the third juice fraction in an amount sufficient to increase the pH level of the third juice fraction from an initial level of about 11.5–11.8 to a level above about 12.6 in a preferred embodiment (e.g. optimally between about 12.5–12.7). These reaction conditions will degrade remaining amounts of dissolved non-sugar impurities which are present in the third juice fraction. Exemplary non-sugar impurities which are degraded include but are not limited to various amino acids and amides, as well as fructose, glucose, glutamine, and asparagine. Furthermore, the term "degrade" as used herein shall involve a chemical process in which the foregoing and other non-sugar impurities are converted to other chemical compositions which are more thermally stable and/or more readily removed in subsequent parts of the system. For example, amides are converted to ammonia and organic lime salts, invert materials (e.g. glucose and fructose) are converted to melanoidins, pectins are transformed into calcium salts/pectates, and long-chain proteins are broken down into short chain compositions and albuminoses. As a result, the third juice fraction is characterized by an increased degree of thermal stability.

The third juice fraction is then combined with a secondary supply of carbon dioxide in a secondary carbonation chamber to remove residual/remaining amounts of lime therefrom (e.g. primarily derived from the main supply of lime). As discussed below, the secondary carbonation chamber is maintained separately from the primary carbonation chamber so that the goals of the present invention may be achieved (e.g. the isolation of flocculated materials from portions of the system beyond the primary carbonation chamber). This process produces a calcium carbonate sludge product within the third juice fraction. The calcium carbonate sludge product is capable of adsorbing residual amounts of dissolved non-sugar impurities which are present within the third juice fraction (including at least some of the degraded materials described above) so that it is purified to an even further extent. In particular, this stage of the treatment process enables the adsorption of residual amounts of dissolved chemical materials from the third juice fraction which impart undesired colors and other adverse characteristics thereto.

Next, the calcium carbonate sludge product is removed from the third juice fraction to produce a treated juice product. The treated juice product is thereafter subjected to additional purification, carbonation, clarification, decolorization, and evaporation steps as may be necessary in connection with standard sugar processing techniques to produce completed crystalline sugar (sucrose). Instead of discarding/storing the calcium carbonate sludge product in accordance with conventional processes (which involve considerable costs and environmental consequences), the calcium carbonate sludge product is physically divided (separated) into a calcium carbonate-containing first sludge portion and a calcium carbonate-containing second sludge portion. In a preferred embodiment, dividing of the calcium carbonate sludge product into the first and second sludge portions involves the step of removing about 5–30% by weight of the calcium carbonate sludge product as the first sludge portion, and removing about 70–95% by weight of the calcium carbonate sludge product as the second sludge portion. To effectively reuse/recycle these materials in accordance with the present invention, the first sludge portion is routed into the preliming chamber to be used as the preliminary supply of calcium carbonate for treating additional quantities of beet juice materials (e.g. diffusion juice) which enter the preliming chamber. By using recycled calcium carbonate sludge materials in this manner (compared with the use of fresh/pure supplies of calcium carbonate in the preliming chamber), storage problems and environmental consequences associated with calcium carbonate waste materials in the system are effectively avoided. Likewise, substantial cost benefits are achieved through the use of recycled materials in the preliming stages of the system, compared with the use of fresh calcium carbonate compositions.

The second sludge portion may thereafter be converted into a supply of regenerated lime in accordance with the present invention. Conversion is typically accomplished by heating the calcium carbonate-containing second sludge portion at a temperature of about 980°–1200° C. over a time period of about 30–120 minutes to generate the supply of regenerated lime (CaO). The regenerated lime may then be routed into the main liming chamber for use as the main supply of lime in the treatment of additional quantities of beet juice materials (e.g. diffusion juice). It should also be noted that the thermal process described above further produces a gaseous reaction product containing about 25–35% by weight gaseous carbon dioxide, with the balance of the reaction product consisting primarily of gaseous nitrogen. This material may, if desired, be routed into at least one (and preferably both) of the primary carbonation chamber for use as the primary supply of carbon dioxide and the secondary carbonation chamber for use as the secondary supply of carbon dioxide.

After preparation of the regenerated lime, a supply of extra (fresh or recycled) lime may be added to the regenerated lime if desired and necessary as determined by preliminary pilot studies. The regenerated lime is then used as discussed above (e.g. as the main supply of lime in the main liming chamber). The extra lime is preferably added to the regenerated lime prior to routing of the regenerated lime into the main liming chamber. In addition, it should be noted an equivalent process would involve combining the second sludge portion with a supply of extra (fresh or recycled) calcium carbonate prior to thermal conversion so that the conversion process will simultaneously transform the second sludge portion and supply of extra calcium carbonate into the regenerated lime product.

Additional variations of the foregoing process may also be undertaken in accordance with the present invention. As noted above in the primary embodiment of the invention, the supply of regenerated lime is routed into the main liming chamber for use as the main supply of lime. In an alternative embodiment, the supply of regenerated lime may be divided (separated) into a first lime fraction and a second lime fraction. The first lime fraction will be routed into the main liming chamber for use as the main supply of lime in treating additional amounts of beet juice materials which enter the main liming chamber. The second lime fraction will be routed into the preliming chamber for use as the preliminary supply of lime in treating additional beet juice materials which enter the preliming chamber. In this embodiment, dividing of the regenerated lime into the first and second lime fractions will preferably involve the step of removing about 80–85% by weight of the regenerated lime as the first lime fraction, and removing about 15–20% by weight of the regenerated lime as the second lime fraction. It should be noted that the same procedure may be followed when the supply of regenerated lime is augmented with extra (fresh or recycled) lime as noted above. Regarding the addition of extra lime, it is optimally added to the regenerated lime prior to dividing of the regenerated lime into the first and second lime fractions.

As previously indicated, the present invention provides numerous benefits. In particular, the invention represents an integrated and substantially self-contained process in which a highly purified beet juice product is manufactured using a minimal number of processing steps with a substantial reduction in the amount of unused waste material and contaminants in the treated juice product. Additional benefits of the invention include but are not limited to: (1) substantial conservation of resources; (2) improvement in the purification efficiency of the system by the careful selection of system locations which receive recycled materials as discussed further below; (3) substantial reduction and/or virtual elimination of unused calcium carbonate sludge products and the environmental/safety hazards associated therewith; and (4) substantial cost savings associated with the reuse and recycling of materials within the system at multiple stages. Accordingly, the present invention represents an advance in the art of sugar beet processing technology as further discussed below.

These and other objects, features, and advantages of the invention shall be described below in the following Brief Description of the Drawings and Detailed Description of Preferred Embodiments.

BRIEF DESCRIPTION OF THE DRAWINGS

Illustrative and presently preferred embodiments of the present invention are illustrated and shown in the following drawing Figure.

DETAILED DESCRIPTION OF PREFERRED EMBODIMENTS

As previously indicated, the present invention involves a unique and highly efficient method for processing sugar beet juice. In particular, the method described below enables a highly purified product to be produced while conserving and recycling materials used in the reaction process. Conservation and recycling of resources in this manner provides numerous safety, economic, and environmental benefits. These benefits are achieved by the use of multiple recycling stages as discussed below.

Figure 1:
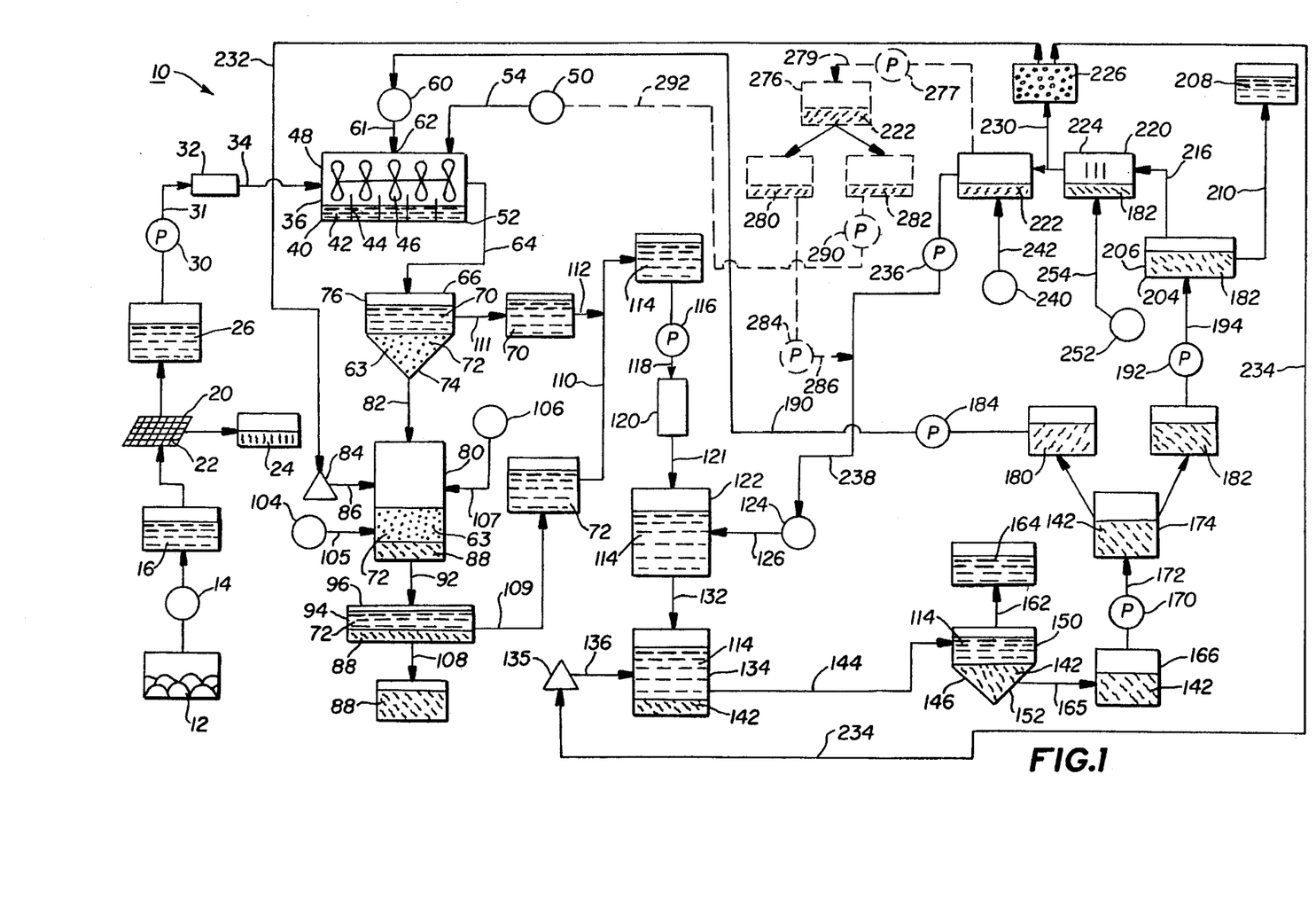
FIG. 1 is a schematic illustration of the process steps and components used in connection with preferred embodiments of the invention to produce a purified beet juice product.

With reference to FIG. 1, a system 10 suitable for use in accordance with the present invention is schematically illustrated. As shown in FIG. 1, a supply of raw sugar beets 12 is provided which is passed through an extraction system 14 in order to produce a raw beet juice product 16. Specifically, the supply of raw sugar beets 12 is initially washed to remove dirt and other external contaminants, followed by placement of the washed beets 12 in the extraction system 14. Many different types of systems may be used in connection with the extraction system 14, with the present invention not being limited to any particular machinery or components for this purpose. In a preferred embodiment, the extraction system 14 will consist of a slicing apparatus which cuts each individual sugar beet into a plurality of thin strips conventionally known as "cossettes" The cossettes are then placed in contact with a counter-current flow of heated water (e.g. at a temperature of about 65°–85° C.) in order to cause the diffusion of sugar-containing materials from the cossettes into the water. As a result, the raw beet juice product 16 is produced which normally includes a considerable amount of beet tissue particles and about 13–16% by weight water soluble materials (including sugar [sucrose] compositions).

The raw beet juice product 16 is thereafter passed through a physical separation apparatus 20 to remove beet juice particles and other suspended solid materials therefrom. In a preferred embodiment, the physical separation apparatus 20 will consist of at least one vibrating or stationary screen unit 22 having an optimum mesh size of about 18–20 U.S. standard mesh. The retained solid materials 24 (again consisting primarily of beet particles and other extraneous particulate matter) are either discarded or processed in a conventional manner for use as livestock feed. The liquid which passes through the separation apparatus 20 will consist of filtered beet juice which is otherwise known as "diffusion juice" 26 (FIG. 1). The diffusion juice 26 normally contains water, sugar (e.g. sucrose) dissolved non-sugar impurities, and colloidal non-sugar impurities. In particular, the diffusion juice 26 typically comprises about 82–85% by weight water, about 13–15% by weight sugar (sucrose), and about 2.0–3.0% by weight various dissolved non-sugar impurities. The overall weight of the diffusion juice 26 is normally about 105–130% of the weight of the raw beets 12 being processed. Exemplary dissolved non-sugar impurities will include but not be limited to inorganic and organic acids, phosphate compositions, metal ions (e.g. iron, aluminum, and/or magnesium ions), proteins, pectins, coloring agents, and saponins. Likewise, exemplary colloidal non-sugar impurities will include but not be limited to amino acids, amides, glutamine, asparagine, and similar compositions. In most cases, the non-sugar impurities which are present within the diffusion juice 26 are highly colorized and thermally unstable. As a result, they can significantly interfere with sugar production from both a qualitative and quantitative standpoint. From this reason, it is necessary to remove as much of the non-sugar impurities as possible so that a highly purified crystalline sugar product can be produced.

With continued reference to FIG. 1, the diffusion juice 26 is initially passed via pump 30 (e.g. of a conventional volumetric or centrifugal type) and conduit 31 into a first heating unit 32. Many different types of commercially-available heating systems may be used in connection with the heating unit 32, and the present invention shall not be limited exclusively to any particular heating apparatus. In a preferred embodiment, the heating unit 32 will consist of a conventional multiple pass tube heating system or a plate heater apparatus known in the art for heating fluid materials. In this regard, the heating unit is optimally in-line and in fluid communication with the conduit 31 as illustrated. To achieve optimum results, it is preferred that the diffusion juice 26 be heated within the heating unit 32 to a temperature of about 65°–85° C. Heating at this temperature is designed to increase the reaction speed within subsequent (e.g. pre-liming) stages of the system 10, and to likewise deactivate enzyme materials present within the diffusion juice 26. It should also be noted that the pH of the diffusion juice 26 at this point in the system 10 is about 6.3–6.5.

The heated diffusion juice 26 is then passed via conduit 34 into a preliming chamber 36 normally constructed of steel or other relatively inert composition. The preliming chamber 36 may involve many different structural forms, and the present invention shall not be limited to any particular designs in connection with the preliming chamber 36. However, in a preferred embodiment, the preliming chamber 36 will consist of an elongate tank 40 having a plurality of individual compartments 42 therein which are separated by baffle members 44. The baffle members 44 are designed to permit fluid communication/fluid flow between the compartments 42. Positioned within each compartment 42 as schematically illustrated in FIG. 1 is a movable paddle-type agitating member 46. This type of preliming chamber 36 and the benefits associated therewith are disclosed in U.S. Pat. No. 2,774,693 to Brieghel-Müller which is incorporated herein by reference.

The diffusion juice 26 enters the preliming chamber 36 at the first end 48 thereof via conduit 34. Simultaneously with the introduction of diffusion juice 26 into the first end 48 of the preliming chamber 36, a preliminary supply of lime 50 is directed into the chamber 36 at the opposite or second end 52 via a conduit 54. As noted above, the terms "lime", "lime materials", "milk of lime", and "lime compositions" as used herein shall be considered equivalent to each other, with such terms involving calcium oxides or hydroxides in solid (powder) or liquid (suspension) form. In a preferred embodiment, milk of lime will be used which essentially involves a water-based lime slurry consisting of $Ca(OH)_2$ which is well known in the art and suitable for use as a preliming agent. Milk of lime is produced in accordance with the following reaction:

$$CaO + H_2O \rightleftharpoons Ca(OH)_2 + 15.5 \text{ Cal.} \qquad (2)$$

To achieve optimal results, milk of lime materials suitable for use as the preliminary supply of lime 50 will contain about 150–170 g of CaO per liter of water to achieve a milk of lime product which is about 30–35 brix density.

The preliminary supply of lime 50 is added to the diffusion juice 26 in an amount sufficient to increase the pH of the juice 26 from the initial pH level listed above to a level above about 11.6 (e.g. optimally between about 11.5–11.8). To accomplish this goal in accordance with the present invention, the preliminary supply of lime 50 (e.g. milk of lime as described above at a brix density level of about 30–35) is added to the diffusion juice 26 in a milk of lime: diffusion juice weight ratio of about 1:70 to 1:90. However, the foregoing numerical values are provided for example purposes only, and may vary as determined by preliminary pilot studies on the particular type of diffusion juice 26 being treated.

In addition, during the preliming process, a preliminary supply of calcium carbonate 60 (e.g. $CaCO_3$) is added to the preliming chamber 36 (e.g. tank 40) via conduit 61. Addition of the preliminary supply of calcium carbonate 60 preferably occurs at or near the midpoint 62 of the tank 40 illustrated in FIG. 1. While the preliminary supply of calcium carbonate 60 may involve the use of fresh, unused materials, it is preferred that the supply of calcium carbonate 60 actually consist of recycled calcium carbonate sludge materials received from subsequent portions of the system 10 (discussed below). In a preferred embodiment (using either fresh or recycled materials), the preliminary supply of calcium carbonate 60 will preferably involve a water-based sludge or slurry which optimally contains about 150–170 g of calcium carbonate per liter of water. This water-based composition used as the preliminary supply of calcium carbonate 60 is preferably added to the diffusion juice 26 in a calcium carbonate composition: diffusion juice weight ratio of about 1:35 to 1:45. This aspect of the present invention, as well as the function of the preliminary supply of calcium carbonate 60, will be described in further detail below.

Addition of the preliminary supply of lime 50 to the diffusion juice 26 in a gradual and progressive manner within the preliming chamber 36 (e.g. as described in U.S. Pat. No. 2,774,693) effectively causes a substantial portion of the dissolved non-sugar impurities within the juice 26 to flocculate and produce a plurality of floc particles 63 (FIG. 1). Flocculated non-sugar impurities will typically involve a variety of undesired contaminants as noted above, including but not limited to inorganic acids, organic acids, phosphate compositions, metal ions (e.g. iron, aluminum, and/or magnesium ions), proteins, pectins, coloring agents, and saponins. Of primary concern at this point is the flocculation of protein materials. When the pH of the diffusion juice 26 increases during preliming, the iso-electric points of many dissolved proteins within the juice 26 are reached, thereby causing flocculation. The term "iso-electric point" is defined above.

It should also be noted that use of the preliminary supply of calcium carbonate 60 in the preliming process (e.g. within the preliming chamber 36) provides numerous benefits. The preliminary supply of calcium carbonate 60 forms cores or substrates which are surrounded (encapsulated) by flocculated protein materials. This process increases the weight and density of the floc particles 63, thereby facilitating the filtration/settling of such materials and subsequent removal from the system 10 as discussed below. Finally, the supply of calcium carbonate 60 functions as a filter aid within the system 10 during the separation of solid and liquid components. In summary, the main goals which are accomplished by preliming include the flocculation of protein materials and other dissolved non-sugar materials, pH stabilization of the juice materials, substantial decolorization of the juice materials, and improved filterability of liquid products. Of particular importance is the precipitation of undesired contaminants as discussed above.

The prelimed diffusion juice 26 is then routed via a conduit 64 to a gravity settling tank 66. As a direct result of the preliming process, the prelimed diffusion juice 26 separates into and produces a first juice fraction 70 and a second juice fraction 72 (FIG. 1). The first juice fraction 70 is substantially free from solid contaminants including floc particles 63. In contrast, the second juice fraction 72 primarily involves a fluidized mixture of the floc particles 63 along with residual amounts of prelimed juice 26. As illustrated in FIG. 1, the second juice fraction 72 and accompanying floc particles 63 primarily reside within the lower portion 74 of the settling tank 66, with the first juice fraction 70 residing within the upper portion 76 of the settling tank 66.

As discussed in U.S. Pat. No. 4,795,494 to Toth et al., it has been discovered that many of the floc particles 63 produced during the preliming stage are sensitive and can be destroyed by harsh mechanical/chemical conditions which are present within subsequent stages of the treatment process, including the main liming stage as indicated below. In most cases, destruction of these materials (e.g. floc particles 63) is caused by the repeptization and dissolution of proteins within the floc particles 63, as well as physical damage to floc particles 63 caused by mechanical agitation within the system 10. As a result, contaminants are reintroduced into the beet juice materials in a manner which makes them difficult to remove using standard physical separation processes (e.g. filtration and the like). To avoid these problems and prevent reintroduction/dissolution of the floc particles 63 in subsequent stages of the system 10, the first juice fraction 70 is separated from the second juice fraction 72 (which naturally occurs within the gravity settling tank 66 as described above). The second juice fraction 72 is then routed into a primary carbonation chamber 80 via conduit 82. Within the primary carbonation chamber 80, the second juice fraction 72 is combined with a primary supply of gaseous carbon dioxide 84 which is introduced into the chamber 80 via conduit 86. This step is designed to remove residual/remaining amounts of the preliminary supply of lime 50 from the second juice fraction 72 (e.g. at least about 95% by weight of the lime 50). The supply of gaseous carbon dioxide 84 may involve fresh, commercially-available supplies of carbon dioxide or (in a preferred embodiment) a carbon dioxide-containing gaseous reaction product generated in subsequent portions of the system 10 as discussed below in connection with the preparation of a supply of regenerated lime. The gaseous reaction product will typically contain about 25–35% by weight gaseous carbon dioxide with the balance of the product consisting primarily of gaseous nitrogen (also discussed below). To achieve optimum results, about 0.12–0.15 tons of the gaseous reaction product will be used per ton of second juice fraction 72. However, the present invention shall not be limited to the foregoing numerical parameters or materials which are provided for example purposes. Precise amounts of carbon dioxide 84 to be combined with the second juice fraction 72, as well as the particular sources of the carbon dioxide 84 to be employed within the system 10 will vary in view of numerous factors as determined by preliminary pilot tests. Furthermore, residence time of the second juice fraction 72 within the primary carbonation chamber 80 will be about 10–20 minutes in a preferred embodiment.

Upon carbonation of the second juice fraction 72, a solid calcium carbonate reaction product 88 is produced within the second juice fraction 72. These combined materials are then routed via conduit 92 into a conventional separation system 94 which preferably involves a standard vacuum filtration apparatus 96.

As noted above, combination of the primary supply of carbon dioxide 84 with the second juice fraction 72 removes remaining/residual amounts of the preliminary supply of lime 50 which are present in the second juice fraction 72. Implementation of the carbonation process as described above can result in removal of up to about 95% by weight of the lime 50 so that the second juice fraction 72 can be purified as previously noted. Removal is accomplished by a chemical reaction between the carbon dioxide 84 and preliminary supply of lime 50 which creates a sludge-type calcium carbonate reaction product 88 as stated above. The calcium carbonate reaction product 88 provides numerous benefits within the primary carbonation chamber 80 and separation system 94. For example, the calcium carbonate reaction product 88 functions as a filter aid regarding the removal of floc particles 63 and other residual solids from the second juice fraction 72 within the separation system 94. The calcium carbonate reaction product 88 also encapsulates at least some of the floc particles 63 received from the second juice fraction 72 with a scale-like coating to prevent the repeptization and dissolution of protein materials within the particles 63. Furthermore, the calcium carbonate reaction product 88 is surface-active, and therefore capable of adsorbing various dissolved non-sugar contaminants thereon which remain within the second juice fraction 72 as it comes in contact with the reaction product 88 within the primary carbonation chamber 80 and/or separation system 94.

Before or preferably during combination of the second juice fraction 72 with the primary supply of carbon dioxide 84 in the primary carbonation chamber 80, an optional supply of additional calcium carbonate 104 may be added to the second juice fraction 72 via conduit 105. This step is designed to further enhance the filter aid, encapsulation, and adsorption capabilities of the system 10 within the primary carbonation chamber 80 and/or separation system 94 (e.g. vacuum filtration apparatus 96). The amount of calcium carbonate 104 to be added will vary in accordance with the chemical character and composition of the juice materials being treated. These factors, as well as the need for additional calcium carbonate 104, may be determined by preliminary pilot studies on the juice compositions of concern. However, optimum results may be achieved in most cases when the additional calcium carbonate 104 involves a water-based sludge or slurry of the same type, origin, and concentration described above in connection with the preliminary supply of calcium carbonate 60. In a preferred embodiment, this composition (when used as the supply of additional calcium carbonate 104) is added to the second juice fraction 72 in a calcium carbonate: second juice fraction weight ratio of about 1:80 to 1:100. Furthermore, the supply of additional calcium carbonate 104 may be derived from fresh calcium carbonate compositions or recycled calcium carbonate materials from subsequent portions of the system 10.

In addition to or instead of using the supply of additional calcium carbonate 104 within the primary carbonation chamber 80, the second juice fraction 72 may be combined with an optional supply of additional lime 106 via conduit 107. The supply of additional lime 106 may be added before or preferably during combination of the second juice fraction 72 with the primary supply of carbon dioxide 84 in the primary carbonation chamber 80. The use of controlled, non-excessive quantities of additional lime 106 at this stage is designed to generate further amounts of calcium carbonate when the lime is combined (reacted) with the carbon dioxide 84. These further amounts of calcium carbonate provide a variety of benefits, including those listed above in connection with the supply of additional calcium carbonate 104 and the calcium carbonate reaction product 88. In this regard, the further amounts of calcium carbonate generated through the use of additional lime 106 enhance the filter aid, encapsulation, and adsorption capabilities of the system 10 within the primary carbonation chamber 80 and/or separation system 94 (e.g. vacuum filtration apparatus 96). The amount of additional lime 106 to be added will vary in accordance with the chemical character and composition of the juice materials being treated. These factors, as well as the need for additional lime 106, may be determined by preliminary pilot studies on the juice compositions of concern. However, optimum results may be achieved in most cases when the additional lime 106 involves a milk of lime composition of the same type, origin, and concentration described above in connection with the preliminary supply of lime 50. In a preferred embodiment, this composition (when used as the supply of additional lime 106) is added to the second juice fraction 72 in a lime: second juice fraction weight ratio of about 1:70 to 1:90 which enables the foregoing goals to be accomplished without adding excessive amounts of lime to the system 10. Furthermore, the supply of additional lime 106 may be derived from fresh lime compositions or recycled/regenerated lime materials from subsequent portions of the system 10.

The calcium carbonate reaction product 88 (which contains encapsulated floc particles 63 and other entrained solid materials therein) is separated (removed) from the second juice fraction 72 within the separation system 94 via conduit 108. The resulting calcium carbonate reaction product 88 can (depending on the calcium content thereof) often be used as a livestock feed material/supplement due to its high protein content and the presence of nutritionally valuable calcium ions therein. Specifically, the calcium carbonate reaction product 88 is suitable for a livestock feed material/supplement if its calcium content is not excessive (e.g. not exceeding about 30– 50 g of calcium per kg of product 88). Implementation of the present invention as discussed above will, in most cases, produce a calcium carbonate reaction product 88 suitable for livestock feeding purposes. Materials with excessively high calcium levels that cannot be used as livestock feed materials are stored or disposed of in a conventional manner. Furthermore, removal of these materials at this stage in the reaction process is an important part of the claimed system in that it prevents their reintroduction in subsequent (e.g. liming) stages of the process. This procedure (in combination with the recycling/regeneration steps described below) results in a processing system having a high degree of overall operating efficiency.

Next, the first juice fraction 70 described above (which is substantially floc-free) and the filtered second juice fraction 72 are recombined and processed in a main liming stage within the system 10 for further purification. In a preferred embodiment, the second juice fraction 72 is routed via conduit 109 from the separation system 94 into an additional conduit 110 as illustrated in FIG. 1. Also entering the conduit 110 via conduits 111, 112 from the upper portion 76 of the gravity settling tank 66 is the first juice fraction 70. Accordingly, both the first juice fraction 70 and the second juice fraction 72 combine within the conduit 110 to produce a third juice fraction 114 (FIG. 1). The third juice fraction 114 is thereafter transferred via in-line pump 116 (e.g. of a conventional volumetric or centrifugal type) and conduit 118 into a second heating unit 120. In a preferred embodiment, the second heating unit 120 is of the same general type as the first heating unit 32 described above. However, the present invention shall again not be limited exclusively to any particular heating apparatus in connection with the second heating unit 120. To achieve optimum results, it is preferred that the third juice fraction 114 be heated within the heating unit 120 to a temperature of about 85°–90° C. Heating at this temperature is designed to activate various chemical reactions which degrade soluble non-sugar materials as discussed below. It should also be noted that the pH of the third juice fraction 114 at this point within the system 10 is about 11.3–11.5. As discussed below, the heated third juice fraction 114 is now directed into a main liming chamber 122 (FIG. 1) via conduit 121.

While the first juice fraction 70 and the second juice fraction 72 are preferably combined to produce the third juice fraction 114 and thereafter heated prior to entering the main liming chamber 122, equivalent results may be achieved by individually heating the first and second juice fractions 70, 72 to the foregoing temperature level and combining them after entering the main liming chamber 122. Likewise, the third juice fraction 114 (or first and second individual juice fractions 70, 72) can be heated after entering the main liming chamber 122, although it is preferred that heating take place prior to entry.

Once the third juice fraction 114 is within the main liming chamber 122, it is combined with a main supply of lime 124 via conduit 126 (FIG. 1). The main supply of lime 124 will actually consist of a recycled/regenerated product obtained from subsequent portions of the system 10 as discussed below. This is an important aspect of the present invention and provides numerous benefits from an economic, environmental, and safety standpoint (also discussed below).

The main supply of lime 124 is added to the third juice fraction 114 in an amount sufficient to increase the pH of the third juice fraction 114 from the level listed above (e.g. about 11.3–11.5) to a level above about 12.6 (optimally between about 12.5–12.7). The main supply of lime 124 may consist of dry (powdered) lime or, in a preferred embodiment, milk of lime. If milk of lime is used as the main supply of lime 124, it is preferably manufactured by using about 150–170 g of CaO per liter of water to produce a milk of lime product having a brix density level of about 30–35. In a preferred embodiment involving the use of milk of lime having the characteristics set forth above, the main supply of lime 124 is added to the third juice fraction 114 in a milk of lime: third juice fraction weight ratio of about 1:10 to 1:14. However, the foregoing numerical values are provided for example purposes only, and may vary as determined by preliminary pilot studies on the particular beet juice compositions being treated.

Within the main liming chamber 122, the third juice fraction 114 is combined with the main supply of lime 124 in order to increase the pH of the third juice fraction 114 as described above. These reaction conditions will degrade remaining amounts of the dissolved non-sugar impurities which are present in the third juice fraction 114. Exemplary non-sugar impurities which are degraded in this portion of the system 10 include but are not limited to amino acids/amides, glucose, fructose, asparagine, glutamine, and other comparable materials. Furthermore, the term "degrade" as used herein shall involve a chemical process in which the foregoing and other non-sugar impurities are converted to other chemical compositions which are more thermally stable and/or more readily removed in subsequent parts of the system. For example, amides are converted to ammonia and organic lime salts, invert materials (e.g. glucose and fructose) are converted to melanoidins, pectins are transformed into calcium salts/pectates, and long-chain proteins are broken down into short chain compositions and albuminoses as further discussed below. Accordingly, the third juice fraction is characterized by an increased degree of thermal stability.

The basic goal of main liming within the main liming chamber 122 is to achieve beet juice thermostability by decomposition of amino acids, amides, and other comparable materials as previously discussed. If not eliminated, these materials may cause serious difficulties in later stages of the purification process. Residence time of the main supply of lime 124 and the third juice fraction 114 within the main liming chamber 122 is preferably about 20–25 minutes. However, this time period may vary based on numerous external factors as initially determined by preliminary tests.

Under the reaction conditions within the main liming chamber 122, amino acids are decomposed, with ammonia being released as indicated above. The released ammonia forms ammonium hydroxide which is driven out of the system 10 during subsequent evaporation stages. Some of the generated ammonia reacts with calcium ions in the main liming chamber 122 to produce soluble amino salts. Invert sugar materials within the main liming chamber 122 are decomposed into various organic acids including but not limited to lactic acid, gluconic acid, apogluconic acid, saccharic acids, and various humic acids. In the presence of calcium ions within the main liming chamber 122 (which are derived from the main supply of lime 124), the foregoing acids typically form soluble calcium salts. These materials are treated/removed in later portions of the system 10. However, the main liming step described above destroys a substantial amount of undesired materials and produces a third juice fraction 114 of even greater thermal stability.

The third juice fraction 114 is thereafter routed via conduit 132 into a secondary carbonation chamber 134 of substantially the same design as the primary carbonation chamber 80. However, it is an important aspect of the system 10 that the secondary carbonation chamber 134 be maintained separately and apart from the primary carbonation chamber 80 so that the processes and materials therein do not interfere with each other (e.g. to ensure that flocculated materials from the primary carbonation chamber 80 do not re-enter later portions of the system 10). Within the secondary carbonation chamber 134, the third juice fraction 114 is combined with a secondary supply of gaseous carbon dioxide 135 which is introduced via conduit 136. This step is designed to remove residual/remaining amounts of the main supply of lime 124 from the third juice fraction 114 and to assist in the further purification thereof. The secondary supply of gaseous carbon 135 dioxide may involve fresh, commercially-available supplies of carbon dioxide or (in a preferred embodiment) a carbon dioxide-containing gaseous reaction product generated in subsequent portions of the system 10 as discussed below in connection with the preparation of a supply of regenerated lime. The gaseous reaction product used within the secondary carbonation chamber 134 will optimally involve the same gaseous reaction product described above in connection with the primary supply of gaseous carbon dioxide 84. Specifically, this material will typically contain about 25–35% by weight gaseous carbon dioxide with the balance of the product primarily involving gaseous nitrogen (also discussed below). To achieve optimum results, about 1.2–1.5 tons of the foregoing gaseous reaction product will be used per ton of third juice fraction 114. However, the present invention shall not be limited to the foregoing numerical parameters or materials which are provided for example purposes. Precise amounts of carbon dioxide 135 to be combined with the third juice fraction 114, as well as the particular sources of the carbon dioxide 135 to be employed within the system 10 will vary in view of numerous factors as determined by preliminary pilot tests. Furthermore, residence time of the third juice fraction 114 within the secondary carbonation chamber 134 will be about 15–20 minutes in a preferred embodiment.

Combination of the third juice fraction 114 with the secondary supply of carbon dioxide 135 produces a calcium carbonate sludge product 142 within the third juice fraction 114. These materials are thereafter routed via conduit 144 to a gravity settling tank 146 of conventional design (e.g. the same type as settling tank 66 described above). Within the settling tank 146, the sludge product 142 gravitationally separates from the third juice fraction 114 so that the third juice fraction 114 is positioned within the upper portion 150 of the tank 146, with the sludge product 142 being positioned within the lower portion 152 of the tank 146. Carbonation of the third juice fraction 114 in the foregoing manner effectively removes at least about 95% by weight of remaining/residual amounts of the main supply of lime 124 from the third juice fraction 114. In addition, the calcium carbonate sludge product 142 (which is surface-active) effectively performs a decolorization function. Specifically, residual amounts of dissolved non-sugar materials within the third juice fraction 114 (including those responsible for adding color to the juice materials and at least some of the degraded materials produced within the main liming chamber 122) are adsorbed by the sludge produce 142 and effectively removed. Exemplary colorizing materials and contaminants which are removed at this stage include but are not limited to colored polycondensation products, melanoid resins, carmelization products, and the like. As a result, the third juice fraction 114 has an even higher degree of purity/thermal stability with a substantial absence of coloring materials therein.

Furthermore, the purification processes within the secondary carbonation chamber 134 are achieved in a highly effective manner compared with conventional systems due to the prior removal of floc particles 63 in previous portions of the system 10. The prior removal of floc particles 63 as discussed above prevents the reintroduction of contaminants within the main liming chamber 122 and secondary carbonation chamber 134.

Thereafter, the sludge product 142 is removed from the carbonated third juice fraction 114. This is accomplished by directing the third juice fraction 114 outwardly from the tank 146 via conduit 162, with the isolated/separated third juice fraction 114 ultimately constituting a treated juice product 164. The treated juice product 164 may thereafter be subjected to additional standard processing steps (including one or more further carbonation stages) as is necessary to produce a final crystalline sugar product. These additional steps include but are not limited to conventional evaporation and crystallization, and may likewise include further treatment/decolorization stages in accordance with standard processing technology. In this regard, the present invention shall not be limited to any particular steps involving further treatment of the juice product 164.

At this point in the system 10, the calcium carbonate sludge product 142 would normally be discarded (e.g. sent to a storage facility or landfill) if traditional sugar processing methods were involved. However, in accordance with the present invention, the calcium carbonate sludge product 142 is recycled/regenerated in a unique manner and routed back into the system 10 for reuse. This method provides numerous benefits and is a substantial departure from traditional processing techniques in which large amounts of sludge materials are stored (causing environmental and containment problems). Exemplary benefits provided by the process described below include but are not limited to (1) substantial conservation of resources; (2) improvement in the purification efficiency of the system by the careful selection of multiple system locations which receive recycled materials; (3) substantial reduction and/or virtual elimination of unused calcium carbonate sludge products and the environmental/safety hazards associated therewith; and (4) substantial cost savings associated with the reuse and recycling of materials within the system at multiple stages as discussed below.

With continued reference to FIG. 1, the recycling/regeneration process associated with a preferred embodiment of the present invention is schematically illustrated. As shown in FIG. 1, the calcium carbonate sludge product 142 is initially routed from the lower portion 152 of the gravity settling tank 146 through conduit 165 into a sludge containment tank 166. From the sludge containment tank 166, the sludge product 142 is transferred via pump 170 (preferably of a conventional volumetric or centrifugal type) through conduit 172 and into a sludge distribution tank 174. From the sludge distribution tank 174, the sludge product 142 is routed back into the system 10 for reuse at multiple locations in order to optimize efficiency and economy in a highly unique manner. In a preferred embodiment, the sludge product 142 within the sludge distribution tank 174 is divided (separated) into a calcium carbonate-containing first sludge portion 180 and a calcium carbonate-containing second sludge portion 182 (FIG. 1). As illustrated in FIG. 1, the first sludge portion 180 is passed through pump 184 and routed via conduit 190 toward the preliming chamber 36. The first sludge portion 180 is thereafter used as the preliminary supply of calcium carbonate 60 in the preliming chamber 36. The second sludge portion 182 is passed through pump 192 and routed via conduit 194 into subsequent portions of the system 10 as discussed below. Pumps 184, 192 are preferably of the same type as pump 170 (e.g. of a conventional volumetric or centrifugal variety).

In a preferred embodiment, division (separation) of the sludge product 142 into the first and second sludge portions 180, 182 will involve removing about 5–30% by weight of the sludge product 142 from the distribution tank 174 as the first sludge portion 180, and removing about 70–95% by weight of the sludge product 142 from the distribution tank 174 as the second sludge portion 182. Removal of the first sludge portion 180 may be accomplished by using the pump 184, with removal of the second sludge portion 182 being undertaken by pump 192. It is immaterial whether the first sludge portion 180 or the second sludge portion 182 is initially removed from the tank 174. For example, the first sludge portion 180 may be initially removed (in the amount listed above), with the remaining sludge materials in the tank 174 constituting the second sludge portion 182 which is thereafter removed. Alternatively, the second sludge portion 182 may be removed first (in the amount listed above), with the remaining sludge materials in the tank 174 constituting the first sludge portion 180 (which is subsequently removed). In a final variation, both of the sludge portions 180, 182 may be removed simultaneously from the tank 174. The first and second sludge portions 180, 182 derived from sludge product 142 will typically contain about 25–35% by weight calcium carbonate.

By using the first sludge portion 180 in the foregoing manner, many substantial benefits are achieved. First, the accumulation of unused calcium carbonate waste products is substantially reduced, thereby avoiding the containment and environmental problems normally associated with these materials. Second, substantial costs savings are achieved by using the first sludge portion 180 as the preliminary supply of calcium carbonate 60 compared with the use of fresh calcium carbonate materials for this purpose. Finally, these benefits are of even greater consequence in accordance with the other recycling stages of the system 10. The system 10 represents a clear departure from prior systems in that it involves an integrated, multi-stage recycling process wherein recycled materials are routed to different parts of the system 10 as discussed below.

Regarding the second sludge portion 182, it is preferably pumped via pump 192 through conduit 194 into a conventional separation apparatus 204 (e.g. preferably of the same type as separation apparatus 94 discussed above). In this regard, optimum results will be achieved if the separation apparatus 204 consists of a vacuum filtration system 206 of standard construction and design. Within the separation apparatus 204, residual water 208 is removed by filtration and settling from the second sludge portion 182 via conduit 210. The residual water 208 is often characterized as "sweet" water since it contains a certain amount of residual sugar materials therein. The residual water 208 is preferably used to prepare additional milk of lime for subsequent use in the system 10 or otherwise reintroduced into the system 10 at any other desired location where additional supplies of water are needed. The removal of residual water 208 at this stage facilitates subsequent treatment/regeneration of the second sludge portion 182 as discussed below.

After passing through the separation apparatus 204, the second sludge portion 182 (which has a substantially reduced water content) is routed via conduit 216 into a conversion unit 220 wherein the second sludge portion 182 is converted into a supply of regenerated lime 222. In a preferred embodiment, the conversion unit 220 will consist of a conventional kiln apparatus 224 in which the second sludge portion 182 is heated (calcined) to a temperature of about 980°–1200° C. for a time period of about 30–120 minutes to produce the regenerated lime 222 in accordance with the following basic reaction:

$$CaCO_3 + 43.3 \text{ cal.} \leftrightarrows CaO + CO_{2(g)} \qquad (3)$$

Specific technical aspects and details regarding the thermal calcination of calcium carbonate materials to produce lime (CaO) are discussed in McGinnis, R. A. (ed.), *Beet-Sugar Technology*, Beet Sugar Development Foundation, Fort Collins, Colo. (USA), Ch. XVII, 3rd ed., pp. 567–593 (1982) which is incorporated herein by reference. The foregoing calcination process is about 90–95% efficient, thereby producing substantial amounts of regenerated lime 222. This process also generates a gaseous reaction product 226 which consists of about 25–35% by weight gaseous carbon dioxide, with the balance of the reaction product 226 consisting primarily of gaseous nitrogen. This material is routed out of the conversion unit 220 via conduit 230. In a preferred embodiment as discussed below, the gaseous reaction product is optimally routed into at least one (and preferably both) of (1) the primary carbonation chamber 80 for use as the primary supply of carbon dioxide 84 (via conduit 232); and (2) the secondary carbonation chamber 134 for use as the secondary supply of carbon dioxide 135 (via conduit 234).

After production as described above, the supply of regenerated lime 222 (optimally in the form of milk of lime as discussed below) is sent via pump 236 (e.g. of the same type as pumps 184, 192) and conduit 238 toward and into the main liming chamber 122 for use as the main supply of lime 124. Many benefits are achieved by this process including a substantial reduction in waste matter, the minimization of safety/environmental concerns, and significant savings in material costs. Economic benefits are achieved by reducing the amount of fresh (unused) lime materials which are needed in the system 10. Furthermore, the foregoing benefits are of even greater consequence which considered in combination with the benefits achieved by using the first calcium carbonate-containing sludge portion 180 as the preliminary supply of calcium carbonate 60. Incidentally, it should be noted that the supply of regenerated lime 222 may be used in dry (powder) form within the main liming chamber 122, or is preferably used as milk of lime by adding water (not shown) to the regenerated lime 222. In a preferred embodiment as described above, the milk of lime in this stage of the system will be prepared by using about 150–170 g of regenerated lime 222 per liter of water.

In addition, it may be necessary and desirable under certain circumstances (as determined by preliminary pilot studies) to add a supply of extra lime 240 (either fresh or recycled/regenerated) to the regenerated lime 222 via conduit 242 as illustrated in FIG. 1. The addition of extra lime 240 to the regenerated lime 222 may be appropriate when large quantities of beet juice materials are being processed within the system 10 (e.g. within the main liming chamber 122), and is usually undertaken in most circumstances. Also, in most cases, a certain amount of lime is lost during the production process, thereby creating a need for the addition of the supply of extra lime 240. If used, the extra lime 240 is preferably added to the regenerated lime 222 prior to routing of the regenerated lime 222 to the main liming chamber 122 in an amount equal to about 0.1–0.6 kg of extra lime 240 per kg of regenerated lime 222. However, the foregoing numerical values are provided for example purposes only, with the specific amount of extra lime 240 to be used being determined by preliminary pilot studies and experimental testing.

Likewise, it shall be deemed equivalent to the foregoing process to add a supply of extra calcium carbonate 252 (either fresh or recycled) via conduit 254 to the conversion unit 220 as shown in FIG. 1. Within the conversion unit 220, the extra calcium carbonate 252 combines with the second sludge portion 182 to produce the supply of regenerated lime 222. If the extra calcium carbonate 252 is used, the combined materials within the conversion unit 220 prior to calcining will preferably consist of about 0.1–1.0% by weight extra calcium carbonate 252, with the remainder consisting of the second sludge portion 182. However, the foregoing numerical parameters and procedures are again provided for example purposes, and the present invention shall not be limited exclusively to any numerical values or processing sequences in this regard.

Finally, it shall be understood that additional modifications to the system 10 may be undertaken which are encompassed within the present invention. These modifications are illustrated in dashed lines in FIG. 1. For example, an additional modification of importance involves a process wherein the supply of regenerated lime 222 (preferably in the form of milk of lime as discussed above) is routed into a storage chamber 276 via pump 277 and conduit 279. The regenerated lime is then divided (separated) into a first lime fraction 280 and a second lime fraction 282. Thereafter, the first lime fraction 280 is routed via pump 284, conduit 286, and conduit 238 into the main liming chamber 122 wherein the first lime fraction 280 is used as the main supply of lime 124. The first lime fraction 280 may be used in dry (powder) form or preferably as milk of lime by adding water (not shown) to the first lime fraction 280. Use of the first lime fraction 280 in the form of milk of lime is preferred so that it can readily be pumped throughout the system. The milk of lime in this alternative embodiment of the invention is preferably prepared by using about 150–170 g of the first lime fraction 280 per liter of water.

The second lime fraction 282 is routed via pump 290 and conduit 292 into the preliming chamber 36 for use as the preliminary supply of lime 50. Again, the second lime fraction 282 may be used in dry (powder) form or preferably as milk of lime in the same manner described above regarding the first lime fraction 280. Use of the first lime fraction 280 and the second lime fraction 282 in the form of milk of lime is again preferred so that these materials can readily be pumped throughout the system 10. In a preferred embodiment, dividing of the supply of regenerated lime 222 into the first lime fraction 280 and the second lime fraction 282 will involve removing about 80–85% by weight of the regenerated lime 222 as the first lime fraction 280 and about 15–20% by weight of the regenerated lime 222 as the second lime fraction 282. However, the present invention shall not be limited to the foregoing numerical parameters which are provided for example purposes. In addition, the pumps 277, 284, 290 are again of the same general type as pumps 192, 236 discussed above.

Dividing (separating) of the regenerated lime 222 into the first lime fraction 280 and the second lime fraction 282 may be undertaken by: (1) initial activation of the pump 284 in order to draw the first lime fraction 280 out of the storage chamber 276, with the remaining materials in the storage chamber 276 constituting the second lime fraction 282 which is then drawn out of the storage chamber 276 using the pump 290; (2) initial activation of the pump 290 in order to draw the second lime fraction 282 out of the storage chamber 276, with the remaining materials in the storage chamber 276 constituting the first lime fraction 280 which is then drawn out of the storage chamber 276 using the pump 284; or (3) simultaneous activation of the pumps 284, 290 to respectively remove the first and second lime fractions 280, 282 from the storage chamber 276 for delivery to the main liming chamber 122 and preliming chamber 36 as discussed above. The foregoing alternative procedures are applicable regardless of whether the supply of extra lime 240 and/or supply of extra calcium carbonate 252 are used to produce the regenerated lime 222. Regarding the use of extra lime 240, this material is optimally added to the regenerated lime 222 prior to dividing of the regenerated lime 222 into the first and second lime fractions 280, 282.

The present invention represents an advance in the art of beet juice processing which provides numerous important benefits including: (1) a substantial conservation of resources; (2) an improvement in the purification efficiency of the system by the careful selection of multiple system locations which receive recycled materials; (3) substantial reduction and/or virtual elimination of unused calcium carbonate sludge products and the environmental/safety hazards associated therewith; and (4) significant cost savings through the use of recycled products at multiple locations within the system. Likewise, the recycling/reprocessing of calcium carbonate waste materials in combination with the flocculation and removal of contaminants from the system prior to liming creates an integrated, multi-step method in which each step contributes to a high degree of system efficiency. Accordingly, the present invention and its unique arrangement of multiple recycling stages and preliminary removal of flocculated materials represents an advance in the art of beet juice processing technology.

Having herein described preferred embodiments of the present invention, it is anticipated that suitable modifications can be made by individuals skilled in the relevant art which nonetheless remain within the scope of the invention. For example, the present invention shall not be exclusively limited to the numerical parameters described above which are provided for example purposes. In this regard, the present invention shall only be construed in accordance with the following claims:

The invention that is claimed is:

1. A method for treating and purifying beet juice using recycled lime and recycled calcium carbonate compositions comprising the steps of:

providing a supply of beet juice comprising water, sugar, and dissolved non-sugar impurities therein;

combining said beet juice with a preliminary supply of lime and a preliminary supply of calcium carbonate in a preliming chamber in order to produce a first juice fraction and a second juice fraction, said second juice fraction comprising a plurality of solid floc particles therein, said floc particles being formed from said non-sugar impurities in said beet juice when said preliminary supply of lime and said preliminary supply of calcium carbonate are combined with said beet juice;

separating said first juice fraction from said second juice fraction;

combining said second juice fraction with a primary supply of carbon dioxide gas in a primary carbonation chamber in order to remove said preliminary supply of lime from said second juice , fraction, said combining of said second juice fraction and said primary supply of carbon dioxide gas producing a calcium carbonate reaction product in said second juice fraction, said calcium carbonate reaction product encapsulating said solid floc particles within said second juice fraction;

removing said calcium carbonate reaction product and said floc particles encapsulated by said calcium carbonate reaction product from said second juice fraction;

recombining said first juice fraction and said second juice fraction in order to produce a third juice fraction;

combining said third juice fraction with a main supply of lime in a main liming chamber in order to degrade remaining amounts of said dissolved non-sugar impurities which are present within said third juice fraction;

combining said third juice fraction with a secondary supply of carbon dioxide gas in a secondary carbonation chamber in order to remove said main supply of lime therefrom, said combining of said third juice fraction with said secondary supply of carbon dioxide gas producing a calcium carbonate sludge product within said third juice fraction, said calcium carbonate sludge product adsorbing residual amounts of said dissolved non-sugar impurities which are present within said third juice fraction, said secondary carbonation chamber being maintained separately from said primary carbonation chamber;

removing said calcium carbonate sludge product from said third juice fraction in order to produce a treated juice product;

dividing said calcium carbonate sludge product into a calcium carbonate-containing first sludge portion and a calcium carbonate-containing second sludge portion;

routing said first sludge portion into said preliming chamber for use as said preliminary supply of calcium carbonate in treating additional quantities of beet juice materials which enter said preliming chamber;

converting said second sludge portion into a supply of regenerated lime, said converting of said second sludge portion into said regenerated lime comprising heating said second sludge portion to a temperature sufficient to produce said regenerated lime from said second sludge portion; and routing said regenerated lime into said main liming chamber for use as said main supply of lime in treating additional quantities of beet juice materials which enter said main liming chamber.

2. The method of claim 1 wherein said combining of said beet juice with said preliminary supply of lime comprises adding said preliminary supply of lime to said beet juice in an amount sufficient to cause said beet juice to have a pH level above about 11.6.

3. The method of claim t further comprising the step of heating said beet juice to a temperature of about 65°–85° C. prior to said combining of said beet juice with said preliminary supply of lime and said preliminary supply of calcium carbonate.

4. The method of claim 1 further comprising the step of heating said third juice fraction to a temperature of about 85°–90°C. when said third juice fraction is combined with said main supply of lime in said main liming chamber.

5. The method of claim 1 wherein said combining of said third juice fraction with said main supply of lime in said main liming chamber further comprises the step of adding said main supply of lime to said third juice fraction in an amount sufficient to cause said third juice fraction to have a pH level above about 12.6.

6. The method of claim 1 further comprising the step of adding a supply of extra lime to said supply of regenerated lime prior to said routing of said regenerated lime into said main liming chamber.

7. The method of claim 1 wherein said dividing of said calcium carbonate sludge product into said first sludge portion and said second sludge portion comprises removing about 5–30% by weight of said calcium carbonate sludge product as said first sludge portion, and removing about 70–95% by weight of said calcium carbonate sludge product as said second sludge portion.

8. The method of claim 1 further comprising the step of adding a supply of additional calcium carbonate to said second juice fraction when said second juice fraction is combined with said primary supply of carbon dioxide gas in said primary carbonation chamber.

9. The method of claim 1 further comprising the step of adding a supply of additional lime to said second juice fraction when said second juice fraction is combined with said primary supply of carbon dioxide gas in said primary carbonation chamber.

10. A method for treating and purifying beet juice using recycled lime and recycled calcium carbonate compositions comprising the steps of:

providing a supply of beet juice comprising water, sugar, and dissolved non-sugar impurities therein;

combining said beet juice with a preliminary supply of lime and a preliminary supply of calcium carbonate in a preliming chamber in order to produce a first juice fraction and a second juice fraction, said second juice fraction comprising a plurality of solid floc particles therein, said floc particles being formed from said non-sugar impurities in said beet juice when said preliminary supply of lime and said preliminary supply of calcium carbonate are combined with said beet juice;

separating said first juice fraction from said second juice fraction;

combining said second juice fraction with a primary supply of carbon dioxide gas in a primary carbonation chamber in order to remove said preliminary supply of lime from said second juice fraction, said combining of said second juice fraction and said primary supply of carbon dioxide gas producing a calcium carbonate reaction product in said second juice fraction, said calcium carbonate reaction product encapsulating said solid floc particles within said second juice fraction;

removing said calcium carbonate reaction product and said floc particles encapsulated by said calcium carbonate reaction product from said second juice fraction;

recombining said first juice fraction and said second juice fraction in order to produce a third juice fraction;

combining said third juice fraction with a main supply of lime in a main liming chamber in order to degrade remaining amounts of said dissolved non-sugar impurities which are present within said third juice fraction;

combining said third juice fraction with a secondary supply of carbon dioxide gas in a secondary carbonation chamber in order to remove said main supply of lime therefrom, said combining of said third juice fraction with said secondary supply of carbon dioxide gas producing a calcium carbonate sludge product within said third juice fraction, said calcium carbonate sludge product adsorbing residual amounts of said dissolved non-sugar impurities which are present within said third juice fraction, said secondary carbonation chamber being maintained separately from said primary carbonation chamber;

removing said calcium carbonate sludge product from said third juice fraction in order to produce a treated juice product;

dividing said calcium carbonate sludge product into a calcium carbonate-containing first sludge portion and a calcium carbonate-containing second sludge portion;

routing said first sludge portion into said preliming chamber for use as said preliminary supply of calcium carbonate in treating additional quantities of beet juice materials which enter said preliming chamber;

heating said second sludge portion to a temperature of about 980°–1200° C. to convert said second sludge portion into a supply of regenerated lime and a gaseous reaction product comprising carbon dioxide therein;

routing said regenerated lime into said main liming chamber for use as said main supply of lime in treating additional quantities of beet juice materials which enter said main liming chamber; and routing said gaseous reaction product into at least one of said primary carbonation chamber and said secondary carbonation chamber for use therein.

11. A method for treating and purifying beet juice using recycled lime and recycled calcium carbonate compositions comprising the steps of:

providing a supply of beet juice comprising water, sugar, and dissolved non-sugar impurities therein;

heating said beet juice to a temperature of about 65°–85° C.;

combining said beet juice with a preliminary supply of lime and a preliminary supply of calcium carbonate in a preliming chamber in order to produce a first juice fraction and a second juice fraction, said second juice fraction comprising a plurality of solid floc particles therein, said floc particles being formed from said non-sugar impurities in said beet juice when said preliminary supply of lime and said preliminary supply of calcium carbonate are combined with said beet juice, said preliminary supply of lime being combined with said beet juice in an amount sufficient to cause said beet juice to have a pH level above about 11.6;

separating said first juice fraction from said second juice fraction;

combining said second juice fraction with a primary supply of carbon dioxide gas in a primary carbonation chamber in order to remove said preliminary supply of lime from said second juice fraction, said combining of said second juice fraction and said primary supply of carbon dioxide gas producing a calcium carbonate reaction product in said second juice fraction, said calcium carbonate reaction product encapsulating said solid floc particles within said second juice fraction;

removing said calcium carbonate reaction product and said floc particles encapsulated by said calcium carbonate reaction product from said second juice fraction;

recombining said first juice fraction and said second juice fraction in order to produce a third juice fraction;

heating said third juice fraction to a temperature of about 85°–90° C.;

combining said third juice fraction with a main supply of lime in a main liming chamber in order to degrade remaining amounts of said dissolved non-sugar impurities which are present within said third juice fraction, said main supply of lime being combined with said third juice fraction in an amount sufficient to cause said third juice fraction to have a pH level above about 12.6;

combining said third juice fraction with a secondary supply of carbon dioxide gas in a secondary carbonation chamber in order to remove said main supply of lime therefrom, said combining of said third juice fraction with said secondary supply of carbon dioxide gas producing a calcium carbonate sludge product within said third juice fraction, said calcium carbonate sludge product adsorbing residual amounts of said dissolved non-sugar impurities which are present within said third juice fraction, said secondary carbonation chamber being maintained separately from said primary carbonation chamber;

removing said calcium carbonate sludge product from said third juice fraction in order to produce a treated juice product;

dividing said calcium carbonate sludge product into a calcium carbonate-containing first sludge portion and a calcium carbonate-containing second sludge portion, said dividing of said calcium carbonate sludge product comprising removing about 5–30% by weight of said calcium carbonate sludge product as said first sludge portion, and removing about 70–95% by weight of said calcium carbonate sludge product as said second sludge portion;

routing said first sludge portion into said preliming chamber for use as said preliminary supply of calcium carbonate in treating additional quantities of beet juice materials which enter said preliming chamber;

heating said second sludge portion to a temperature of about 980°–1200° C. in order to convert said second sludge portion into a supply of regenerated lime and a gaseous reaction product comprising carbon dioxide therein;

adding a supply of extra lime to said supply of regenerated lime;

routing said regenerated lime into said main liming chamber for use as said main supply of lime in treating additional quantities of beet juice materials which enter said main liming chamber; and routing said gaseous reaction product into at least one of said primary carbonation chamber and said secondary carbonation chamber for use therein.

12. A method for treating and purifying beet juice using recycled lime and recycled calcium carbonate compositions comprising the steps of:

providing a supply of beet juice comprising water, sugar, and dissolved non-sugar impurities therein;

combining said beet juice with a preliminary supply of lime and a preliminary supply of calcium carbonate in a preliming chamber in order to produce a first juice fraction and a second juice fraction, said second juice fraction comprising a plurality of solid floc particles therein, said floc particles being formed from said non-sugar impurities in said beet juice when said preliminary supply of lime and said preliminary supply of calcium carbonate are combined with said beet juice;

separating said first juice fraction from said second juice fraction;

combining said second juice fraction with a primary supply of carbon dioxide gas in a primary carbonation chamber in order to remove said preliminary supply of lime from said second juice fraction, said combining of said second juice fraction and said primary supply of carbon dioxide gas producing a calcium carbonate reaction product in said second juice fraction, said calcium carbonate reaction product encapsulating said solid floc particles within said second juice fraction;

removing said calcium carbonate reaction product and said floc particles encapsulated by said calcium carbonate reaction product from said second juice fraction;

recombining said first juice fraction and said second juice fraction in order to produce a third juice fraction;

combining said third juice fraction with a main supply of lime in a main liming chamber in order to degrade remaining amounts of said dissolved non-sugar impurities which are present within said third juice fraction;

combining said third juice fraction with a secondary supply of carbon dioxide gas in a secondary carbonation chamber in order to remove said main supply of lime therefrom, said combining of said third juice fraction with said secondary supply of carbon dioxide gas producing a calcium carbonate sludge product within said third juice fraction, said calcium carbonate sludge product adsorbing residual amounts of said dissolved non-sugar impurities which are present within said third juice fraction said secondary carbonation chamber being maintained separately from said primary carbonation chamber;

removing said calcium carbonate sludge product from said third juice fraction in order to produce a treated juice product;

dividing said calcium carbonate sludge product into a calcium carbonate-containing first sludge portion and a calcium carbonate-containing second sludge portion;

routing said first sludge portion into said preliming chamber for use as said preliminary supply of calcium carbonate in treating additional quantities of beet juice materials which enter said preliming chamber;

converting said second sludge portion into a supply of regenerated lime, said converting of said second sludge portion into said regenerated lime comprising heating said second sludge portion to a temperature sufficient to produce said regenerated lime from said second sludge portion;

dividing said supply of regenerated lime into a first lime fraction and a second lime fraction;

routing said first lime fraction into said main liming chamber for use as said main supply of lime in treating additional quantities of beet juice materials which enter said main liming chamber; and routing said second lime fraction into said preliming chamber for use as said preliminary supply of lime in treating additional quantities of beet juice materials which enter said preliming chamber.

13. The method of claim 12 further comprising the step of heating said beet juice to a temperature of about 65°–85° C. prior to said combining of said beet juice with said preliminary supply of lime and said preliminary supply of calcium carbonate.

14. The method of claim 12 further comprising the step of heating said third juice fraction to a temperature of about 85°–90° C. when said third juice fraction is combined with said main supply of lime in said main liming chamber.

15. The method of claim 12 further comprising the step of adding a supply of extra lime to said supply of regenerated lime prior to said dividing of said regenerated lime into said first lime fraction and said second lime fraction.

16. The method of claim 12 wherein said dividing of said supply of regenerated lime into said first lime fraction and said second lime fraction comprises removing about 80–85% by weight of said supply of regenerated lime as said first lime fraction, and removing about 15–20% by weight of said supply of regenerated lime as said second lime fraction.

17. The method of claim 12 further comprising the step of adding a supply of additional calcium carbonate to said second juice fraction when said second juice fraction is combined with said primary supply of carbon dioxide gas in said primary carbonation chamber.

18. The method of claim 12 further comprising the step of adding a supply of additional lime to said second juice fraction when said second juice fraction is combined with said primary supply of carbon dioxide gas in said primary carbonation chamber.

19. A method for treating and purifying beet juice using recycled lime and recycled calcium carbonate compositions comprising the steps of:

providing a supply of beet juice comprising water, sugar, and dissolved non-sugar impurities therein;

combining said beet juice with a preliminary supply of lime and a preliminary supply of calcium carbonate in a preliming chamber in order to produce a first juice fraction and a second juice fraction, said second juice fraction comprising a plurality of solid floc particles therein, said floc particles being formed from said non-sugar impurities in said beet juice when said preliminary supply of lime and said preliminary supply of calcium carbonate are combined with said beet juice;

separating said first juice fraction from said second juice fraction;

combining said second juice fraction with a primary supply of carbon dioxide gas in a primary carbonation chamber in order to remove said preliminary supply of lime from said second juice fraction, said combining of said second juice fraction and said primary supply of carbon dioxide gas producing a calcium carbonate reaction product in said second juice fraction, said calcium carbonate reaction product encapsulating said solid floc particles within said second juice fraction;

removing said calcium carbonate reaction product and said floc particles encapsulated by said calcium carbonate reaction product from said second juice fraction;

recombining said first juice fraction and said second juice fraction in order to produce a third juice fraction;

combining said third juice fraction with a main supply of lime in a main liming chamber in order to degrade remaining amounts of said dissolved non-sugar impurities which are present within said third juice fraction;

combining said third juice fraction with a secondary supply of carbon dioxide gas in a secondary carbonation chamber in order to remove said main supply of lime therefrom, said combining of said third juice fraction with said secondary supply of carbon dioxide gas producing a calcium carbonate sludge product within said third juice fraction, said calcium carbonate sludge product adsorbing residual amounts of said dissolved non-sugar impurities which are present within said third juice fraction, said secondary carbonation chamber being maintained separately from said primary carbonation chamber;

removing said calcium carbonate sludge product from said third juice fraction in order to produce a treated juice product;

dividing said calcium carbonate sludge product into a calcium carbonate-containing first sludge portion and a calcium carbonate-containing second sludge portion;

routing said first sludge portion into said preliming chamber for use as said preliminary supply of calcium carbonate in treating additional quantities of beet juice materials which enter said preliming chamber;

heating said second sludge portion to a temperature of about 980°–1200° C. to convert said second sludge portion into a supply of regenerated lime and a gaseous reaction product comprising carbon dioxide therein;

dividing said supply of regenerated lime into a first lime fraction and a second lime fraction;

routing said first lime fraction into said main liming chamber for use as said main supply of lime in treating additional quantities of beet juice materials which enter said main liming chamber;

routing said second lime fraction into said preliming chamber for use as said preliminary supply of lime in treating additional quantities of beet juice materials which enter said preliming chamber; and routing said gaseous reaction product into at least one of said primary carbonation chamber and said secondary carbonation chamber for use therein.

20. A method for treating and purifying beet juice using recycled lime and recycled calcium carbonate compositions comprising the steps of:

providing a supply of beet juice comprising water, sugar, and dissolved non-sugar impurities therein;

heating said beet juice to a temperature of about 65°–85° C.;

combining said beet juice with a preliminary supply of lime and a preliminary supply of calcium carbonate in a preliming chamber in order to produce a first juice fraction and a second juice fraction, said second juice fraction comprising a plurality of solid floc particles therein, said floc particles being formed from said non-sugar impurities in said beet juice when said preliminary supply of lime and said preliminary supply of calcium carbonate are combined with said beet juice, said preliminary supply of lime being combined with said beet juice in an amount sufficient to cause said beet juice to have a pH level above about 11.6;

separating said first juice fraction from said second juice fraction;

combining said second juice fraction with a primary supply of carbon dioxide gas in a primary carbonation chamber in order to remove said preliminary supply of lime from said second juice fraction, said combining of said second juice fraction and said primary supply of carbon dioxide gas producing a calcium carbonate reaction product in said second juice fraction, said calcium carbonate reaction product encapsulating said solid floc particles within said second juice fraction;

removing said calcium carbonate reaction product and said floc particles encapsulated by said calcium carbonate reaction product from said second juice fraction;

recombining said first juice fraction and said second juice fraction in order to produce a third juice fraction;

heating said third juice fraction to a temperature of about 85°–90° C.;

combining said third juice fraction with a main supply of lime in a main liming chamber in order to degrade remaining amounts of said dissolved non-sugar impurities which are present within said third juice fraction, said main supply of lime being combined with said third juice fraction in an amount sufficient to cause said third juice fraction to have a pH level above about 12.6;

combining said third juice fraction with a secondary supply of carbon dioxide gas in a secondary carbonation chamber in order to remove said main supply of lime therefrom, said combining of said third juice fraction with said secondary supply of carbon dioxide gas producing a calcium carbonate sludge product within third juice fraction, said calcium carbonate sludge product adsorbing residual amounts of said dissolved non-sugar impurities which are present within said third juice fraction, said secondary carbonation chamber being maintained separately from said primary carbonation chamber;

removing said calcium carbonate sludge product from said third juice fraction in order to produce a treated juice product;

dividing said calcium carbonate sludge product into a calcium carbonate-containing first sludge portion and a calcium carbonate-containing second sludge portion, said dividing of said calcium carbonate sludge product comprising removing about 5–30% by weight of said calcium carbonate sludge product as said first sludge portion, and removing about 70–95% by weight of said calcium carbonate sludge product as said second sludge portion;

routing said first sludge portion into said preliming chamber for use as said preliminary supply of calcium carbonate in treating additional quantities of beet juice materials which enter said preliming chamber;

heating said second sludge portion to a temperature of about 980°–1200° C. in order to convert said second sludge portion into a supply of regenerated lime and a gaseous reaction product comprising carbon dioxide therein;

adding a supply of extra lime to said supply of regenerated lime;

dividing said supply of regenerated lime into a first lime fraction and a second lime fraction, said dividing of said supply of regenerated lime comprising removing about 80–85% by weight of said supply of regenerated lime as said first lime fraction, and removing about 15–20% by weight of said supply of regenerated lime as said second lime fraction;

routing said first lime fraction into said main liming chamber for use as said main supply of lime in treating additional quantities of beet juice materials which enter said main liming chamber;

routing said second lime fraction into said preliming chamber for use as said preliminary supply of lime in treating additional quantities of beet juice materials which enter said preliming chamber; and routing said gaseous reaction product into at least one of said primary carbonation chamber and said secondary carbonation chamber for use therein.

* * * * *

UNITED STATES PATENT AND TRADEMARK OFFICE
CERTIFICATE OF CORRECTION

PATENT NO. : 5,480,490
DATED : January 2, 1996
INVENTOR(S) : Laszlo Toth; John E. Sagaser It is certified that error appears in the above-indentified patent and that said Letters Patent is hereby corrected as shown below:

Col. 1, line 66, "Meller" should be --Müller--.
Col. 5, line 20, delete "o".
Col. 5, line 30, delete "o".
Col. 6, line 14, insert --of-- after "use".

Col. 23, Claim 3, line 34, delete "t" and insert --1--.

Signed and Sealed this

Fourth Day of June, 1996

Attest:

BRUCE LEHMAN

Attesting Officer  *Commissioner of Patents and Trademarks*